T. B. Kirby,

Cage Trap.

No. 82,008.    Patented Sep. 8, 1868.

United States Patent Office.

THOMAS B. KIRBY, OF FLOWERFIELD, MICHIGAN.

Letters Patent No. 82,008, dated September 8, 1868.

IMPROVED ANIMAL-TRAP.

*The Schedule referred to in these Letters Patent and making part of the same.*

TO WHOM IT MAY CONCERN:

Be it known that I, THOMAS B. KIRBY, of Flowerfield, in the county of St. Joseph, and State of Michigan, have invented a new and useful Improvement in a Self-Adjusting Animal-Trap; and do declare that the following is a true and accurate description thereof, reference being had to the accompanying drawing, and to the letters of reference marked thereon, and being a part of this specification.

This invention consists in the construction of a trap for rats and other small animals, that will be self-adjusting, to be set over any proper receptacle for water, and provided with suitable bait-box and self-acting valve, so that when the rat, attracted by the smell of the bait, steps on the valve, his weight causes it to precipitate him into the water beneath, while the valve resumes its original position, ready for another customer.

In order to accomplish this end, I construct a rectangular frame, A, set upon a proper bed-plate, B, which should be large enough to cover the top of a common water-pail. A partition, C, extends across this rectangular frame, A, and the space in the end of the frame so partitioned off is provided with a cover, D. Another partition, E, made of wire cloth, perforated tin, or any other similar material, extends across the other end of the frame A, and the space so partitioned off is also provided with a hinged cover, F. By partitioning off the two ends of the frame as above described, an opening, G, is left in the centre, which should be placed directly over an opening of corresponding size in the bed-plate. This opening should be provided with a proper self-operating valve, H, pivoted to the frame at I, and so arranged that its outer end should be a little the heaviest, and work in that part of the frame partitioned off by the partition C.

To operate this trap, place it over any proper receptacle, arranged so that the rat can get on to it. In the part of the frame partitioned off by the wire partition E, place any suitable bait that, by its scent, will attract the animal, who in endeavoring to get at it will jump into the opening G, upon the valve H, when his weight will instantly open and precipitate him into the receptacle below, and the valve will as instantly close.

The same letters indicate like parts in each figure.

Figure 1:
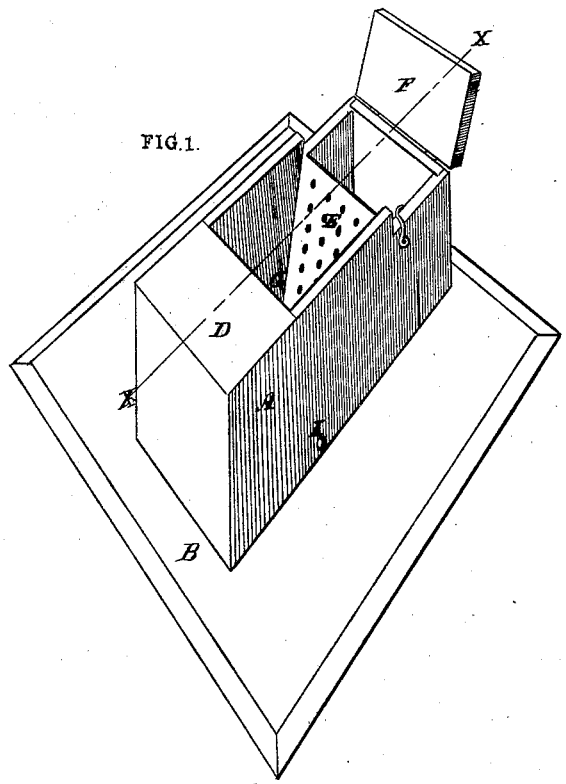
Figure 1 is a perspective view of my apparatus.
Figure 2:
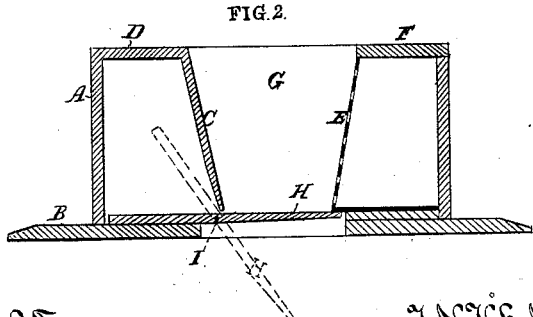
Figure 2 is a sectional view on the line X X, fig. 1.

What I claim as my invention, and desire to secure by Letters Patent, is—

The combination and arrangement in the rectangular frame A, divided by the partitions C and E, of the valve H, with the perforated bait-box K, having a hinged cover, F, substantially as and for the purposes herein set forth.

THOMAS B. KIRBY.

Witnesses:
SAMUEL H. HEPWORTH,
J. G. BLISS.